(12) United States Patent
Brightbill

(10) Patent No.: US 7,433,843 B2
(45) Date of Patent: Oct. 7, 2008

(54) METHODS, SYSTEM, AND COMPUTER-READABLE MEDIUM FOR RECOMMENDING AN AUCTION STRUCTURE

(75) Inventor: Paul Luther Brightbill, Atlanta, GA (US)

(73) Assignee: AT&T Intellectual Property I, L.P., Wilmington, DE (US)

( * ) Notice: Subject to any disclaimer, the term of this patent is extended or adjusted under 35 U.S.C. 154(b) by 626 days.

(21) Appl. No.: 10/831,518

(22) Filed: Apr. 23, 2004

(65) Prior Publication Data

US 2005/0240505 A1  Oct. 27, 2005

(51) Int. Cl.
*G06Q 30/00* (2006.01)

(52) U.S. Cl. .............................. 705/37; 705/26; 705/27

(58) Field of Classification Search .................. 705/26, 705/27, 37
See application file for complete search history.

(56) References Cited

U.S. PATENT DOCUMENTS

| | | | |
|---|---|---|---|
| 5,640,569 A | 6/1997 | Miller | |
| 6,266,805 B1 | 7/2001 | Nwana | |
| 6,314,555 B1 | 11/2001 | Ndumu | |
| 6,629,082 B1 | 9/2003 | Hambrecht | |
| 2001/0042041 A1* | 11/2001 | Moshal et al. ................. 705/37 |
| 2001/0047323 A1 | 11/2001 | Schmidt | |
| 2002/0052828 A1* | 5/2002 | Ausubel ....................... 705/37 |
| 2002/0095366 A1 | 7/2002 | Chang | |
| 2003/0018515 A1 | 1/2003 | Guler | |
| 2003/0018539 A1 | 1/2003 | LaPoutre | |
| 2003/0018562 A1* | 1/2003 | Guler et al. ................... 705/37 |
| 2003/0074301 A1 | 4/2003 | Solomon | |
| 2003/0074330 A1 | 4/2003 | Asokan | |
| 2003/0101124 A1 | 5/2003 | Semret | |
| 2003/0233305 A1 | 12/2003 | Solomon | |
| 2003/0236734 A1 | 12/2003 | Guler | |
| 2004/0010461 A1 | 1/2004 | Boutilier | |
| 2004/0024483 A1 | 2/2004 | Holcombe | |

OTHER PUBLICATIONS

Rhodes-Kropf, Matthew; "Auctions, Information Revelation, and Renegotiation," 1998, Duke University, vol. 5904A of Dissertations Abstracts International, p. 1281, 203 pp.*

* cited by examiner

*Primary Examiner*—Jeffrey A. Smith
*Assistant Examiner*—Adam Levine
(74) *Attorney, Agent, or Firm*—Scott P. Zimmerman, PLLC

(57) ABSTRACT

Methods, systems, and products are disclosed for recommending a structure for an online auction. One method prompts a user to input details of the auction and suggests a reverse auction for sourcing goods and services in a telecommunications environment. If the market price for the auctioned goods/services is stable, then the method establishes a reserve price less than or equal to a contract price. A rank-only Vickery structure may be suggested in which each bidder is only informed of the ranking of the bidder's bid. Each bidder is not informed of a monetary value of the winning bid.

14 Claims, 14 Drawing Sheets

FIG. 5

DETERMINE PRICING VISIBILITY DURING AUCTION EVENT — 114

Will a Vickery auction be considered?

☐ Yes, use modified Vickery auction

☑ No, a Vickery auction is not desired — 90

Choose the visibility option of the supplier during the auction event

| All bid prices visible |
| Rank-only visibility |
| Lead price only |
| Rank w/ lead price |

116

*Rank w/lead price visibility allows suppliers to calculate their costs. This choice allows visibility to the winner and prompt other bidders to stop bidding if the winner took a large price decrement. On the other hand, this option limits the full knowledge of competitiveness of other bidders, perhaps benefiting future auctions.* — 118

⇩ 112  Previous        ⇧ 96  NEXT

FIG. 7

WEIGHTING FACTORS FOR INFLUENCING BID SELECTION

| Supplier Name | Discount Bid by % | Discount Bid by $ |
|---|---|---|
| Acme Industries (incumbent) | 3.5 | 0 |
| Comm Technologies | 0 | 0 |
| Excellent Staffing, Inc. | 0 | 0 |

⇦ Previous    ⇧ NEXT

AUCTION STRUCTURE SUMMARY REPORT

| | | 148 |
|---|---|---|
| AUCTION NAME | 2005COPPERWIRE | Edit |
| AUCTION DATE | June 10 2004 | |
| USER NAME | RJones | |
| NUMBER OF SUPPLIERS | 10 | Edit |
| MARKET PRICE | Decreasing | |
| RESERVE PRICE | 1000000 | Edit |
| TARGET PRICE | 800000 | |
| VICKERY | Modified Vickery | |
| PRICE VISIBILITY | Rank Only | Edit |
| DECREMENTS | $20.00 | |
| VOLUME | 4000 | Edit |
| CLOSING STRATEGY | Indefinite Extensions | Edit |

Supplier Discounted Weighting Factors

| Acme Industries | 3.5 | Edit |
|---|---|---|

150 — SAVE

152 — PRINT

METHODS, SYSTEM, AND COMPUTER-READABLE MEDIUM FOR RECOMMENDING AN AUCTION STRUCTURE

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to data processing and, more particularly, to electronic negotiation using trading, matching, and/or bidding.

2. Description of the Related Art

Traditional procurement utilizes decades-old, mature processes. Traditional procurement efforts utilize a "Request for Quote" procedure. That is, when a buyer wants to purchase goods and/or services, the buyer issues a Request for Quote (sometimes known by the acronym "RFQ" or perhaps "Request for Proposal") to one or more suppliers. The buyer then sends the RFQ to each supplier, awaits their responses, and then awards business to a final supplier. The traditional procurement RFQ process might require weeks, or even months, of effort before a supplier was chosen.

Nowadays, however, buyers are beginning to utilize online, reverse auctions as a sourcing tool. The buyer of goods and/or services typically utilizes the Internet to conduct a real-time, dynamic auction between the buyer and a group of suppliers. Each supplier submits a bid in the hope of winning the auctioned business. Because the online, reverse auction stimulates competition, many buyers are able to reduce the costs of purchased goods and services. As buyers have discovered, the auction bidding process can incite competition and even create a frenzy of bidding, thus lowering the costs of purchased goods/services below that previously obtained through the traditional sourcing process.

Many procurement personnel, however, are unfamiliar with reverse auction concepts and strategies. Because the traditional RFQ sourcing process is decades-old, many people and businesses may be reluctant to adopt new auction practices. Despite the potential savings offered by these new auction practices, many people and companies may be reluctant to tackle the learning curve. There is, accordingly, a need in the art for an easy-to-use procurement tool that teaches a user how to structure an online, reverse auction. There is also a need in the art for a procurement tool that teaches a user how to strategically optimize the design of the auction to optimize the expected outcome.

BRIEF SUMMARY OF THE INVENTION

The aforementioned problems, and other problems, are reduced by this invention. This invention comprises methods, computer systems, computer programs, and computer program products that recommend a structure for an online, reverse auction. This invention guides a user (such as a buyer, supply manager, or procurement specialist) through basic decisions that impact the expected outcome of the reverse auction. The invention is thus an interactive tool that doubles as an educational guide for the user as well as an input mechanism for the structure of the reverse auction. The invention provides a step-by-step process that helps the user understand the incremental impact of their decisions and focuses the user to consider how those decisions will affect the outcome of the auction.

This invention structures an electronic, online reverse auction. The term "electronic reverse auction" means a real-time, dynamic auction between a buyer (such as a buying organization) and a group of suppliers. The dominant delivery system for these reverse auctions is via a distributed computing network, such as the Internet. The suppliers compete (or "bid") against each other to win the business to supply goods and/or services. The main impetus for implementing reverse auctions is to reduce the costs of purchased goods and services below that previously obtained through the traditional sourcing process.

This invention is easy to use. The user simply enters basic information regarding the online, reverse auction. This invention, at each input or decision, presents the options available to the user. The computer program also guides the user as to what decision might best affect the auction outcome. The user thus steps through a series of decisions after considering the options available, and the user sees how those decisions can affect the outcome. The invention presents summaries of previous inputs for quick consultation during the next decision. The computer program, at the end, presents a summary that still permits quick edits to previous inputs. Action buttons allow for quick printing and file saving. The invention is thus a procurement tool designed to consider all available strategic angles and to take the guesswork out of the total cost assumptions.

This invention discloses methods, systems, and products for selecting a structure for an online auction. One of the embodiments describes a method that prompts a user to input details of the auction. The method suggests a reverse auction for sourcing goods and services. A rank-only Vickrey structure may be suggested in which each bidder is only informed of the ranking of the bidder's bid. Each bidder is not informed of a monetary value of the winning bid.

Another of the embodiments describes a system for selecting a structure for an online auction. The system includes an Auction Module stored in a memory device, and a processor communicating with the memory device. The Auction Module prompts a user to input details of the auction. The Auction Module suggests a reverse auction for sourcing goods and services.

Other embodiments of this invention describe a computer program product. A computer-readable medium stores an Auction Module. The Auction Module prompts a user to input details of the auction and suggests a reverse auction for sourcing goods and services.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE SEVERAL VIEWS OF THE DRAWINGS

These and other features, aspects, and advantages of the embodiments of the present invention are better understood when the following Detailed Description of the Invention is read with reference to the accompanying drawings, wherein:

FIGS. 3-9 are schematics illustrating Graphical User Interfaces, according to the embodiments of this invention.

DETAILED DESCRIPTION OF THE INVENTION

Figure 1:
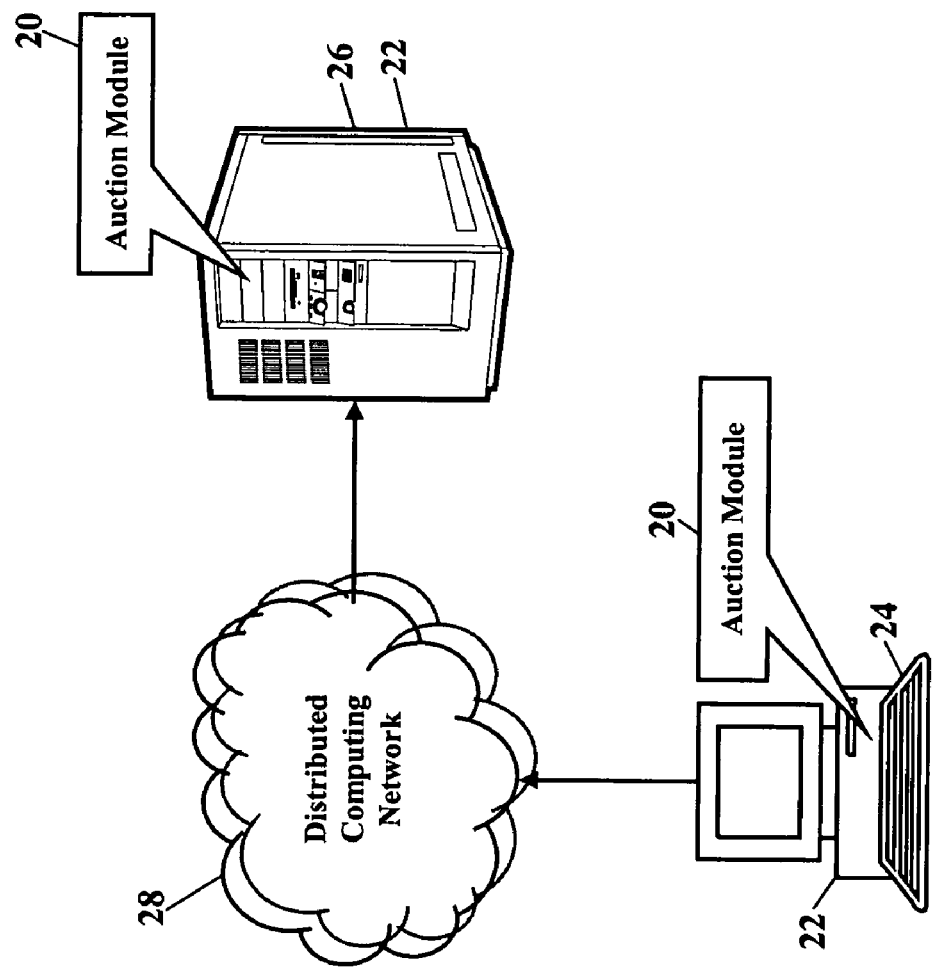
FIG. 1 is a schematic illustrating one possible operating environment for the embodiments of this invention.

This invention now will be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

This invention selects a structure for an online auction. This invention comprises methods, computer systems, computer programs, and computer program products that recommend a structure for an online, reverse auction. This invention guides a user (such as a buyer, supply manager, or procurement specialist) through basic decisions that impact the expected outcome of the reverse auction. The invention is thus an interactive tool that doubles as an educational guide for the user as well as an input mechanism for the structure of the reverse auction. The invention provides a step-by-step process that helps the user understand the incremental impact of their decisions and focuses the user to consider how those decisions will affect the outcome of the auction.

This invention is easy to use. The user simply enters basic information regarding the online, reverse auction. This invention, at each input or decision, presents the options available to the user. The computer program also guides the user as to what decision might best affect the auction outcome. The user thus steps through a series of decisions after considering the options available, and the user sees how those decisions can affect the outcome. The invention presents summaries of previous inputs for quick consultation during the next decision. The computer program, at the end, presents a summary that still permits quick edits to previous inputs. Action buttons allow for quick printing and file saving. The invention is thus a procurement tool designed to consider all available strategic angles and to take the guesswork out of the total cost assumptions.

FIG. 1 is a schematic illustrating this invention. FIG. 1 is a schematic illustrating one possible operating environment for the embodiments of this invention. The embodiments of this invention include an Auction Module 20. The Auction Module 20 comprises methods, systems, computer programs, and/or computer program products that select a structure for an auction. The Auction Module 20 operates within a computer system 22, such as a client computer 24. When a person/organization desires to conduct a reverse auction for sourcing goods and/or services, the Auction Module 20 helps that user/organization optimize the expected outcome of the reverse auction. That is, the Auction Module 20 is a software program that guides a user through various decisions that can impact the expected outcome of the reverse auction. The term "reverse auction" is a real-time dynamic auction between a buying organization and a group of suppliers. The suppliers bid against each other to win business to supply goods and/or services. The Auction Module 20, then, is a tool that helps reduce the costs of purchased goods and services below that previously obtained through more traditional sourcing processes.

The Auction Module 20 may operate locally and/or remotely. FIG. 1 shows the Auction Module 20 locally stored/maintained within the client computer 24. As FIG. 1 also shows, however, the Auction Module 20 may also reside within another computer system 22, such as a computer server 26. The client computer 24 and the computer server 26 communicate with each other via a distributed computing network 28, such as the Internet (sometimes alternatively known as the "World Wide Web"), an intranet, a local-area network (LAN), and/or a wide-area network (WAN). As those of ordinary skill in the art understand, the Auction Module 20 may be locally and/or remotely accessed by any computer system communicating with the distributed computing network 28.

The Auction Module 20 helps select a structure for an online auction. The Auction Module 20 helps a user optimize the expected outcome of the auction. The Auction Module 20 prompts the user to input details of the auction. The Auction Module 20, for example, prompts the user for various information, such as the number of qualified suppliers, market pricing information, reserve pricing, target pricing, bidding adjustments, volume pricing considerations, and other information. The Auction Module 20 then suggests a reverse auction for sourcing goods and services.

Figure 2:
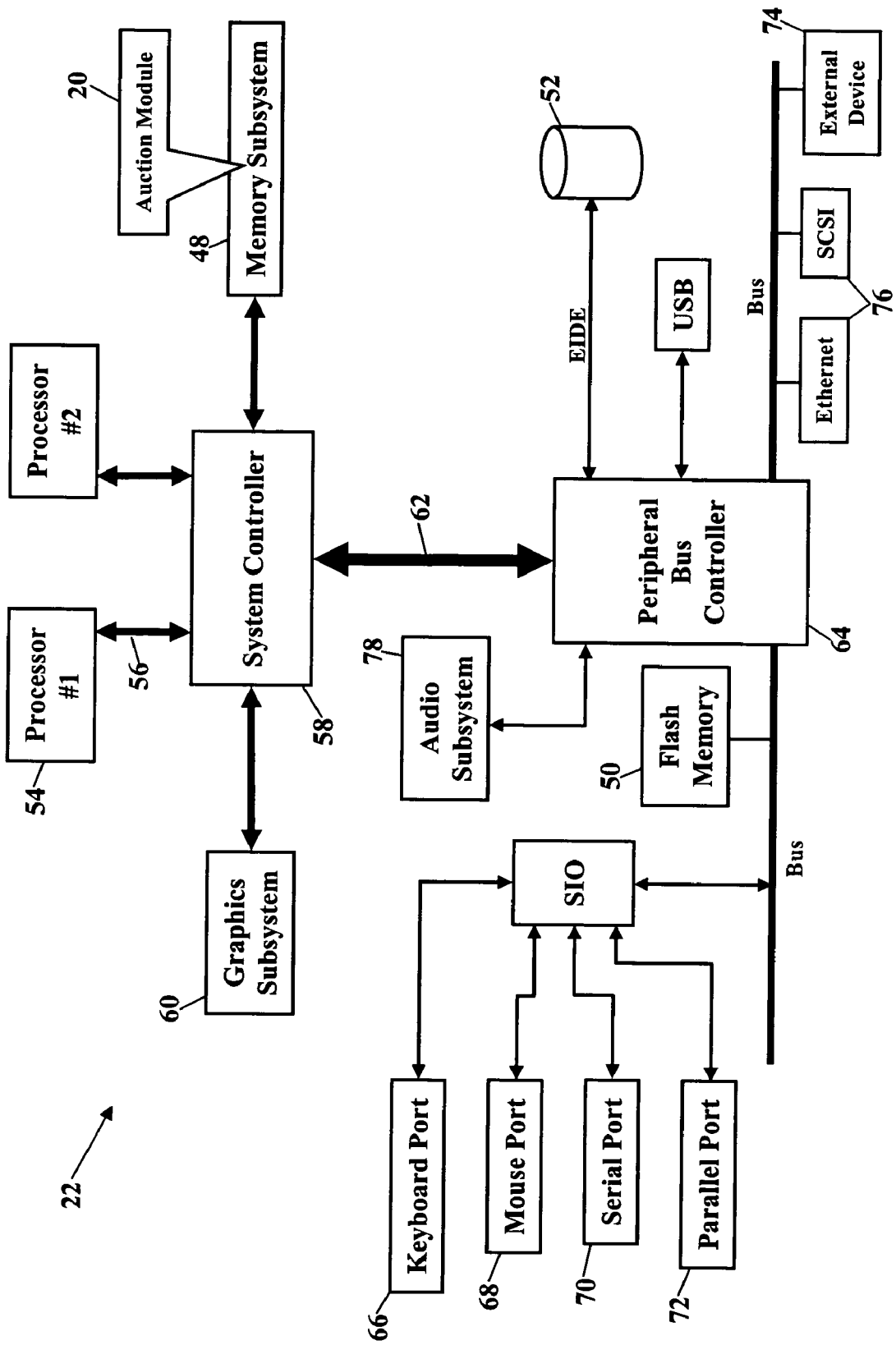
FIG. 2 depicts more possible operating environments for the embodiments of this invention.

FIG. 2 illustrates an alternative operating environment for this invention. FIG. 2 is a block diagram showing the Auction Module 20 residing in the computer system 22. The computer system 22 may be any computing system, such as the client computer 22 and/or the computer server 26. As FIG. 2 shows, the Auction Module 20 operates within a system memory device. The Auction Module 20, for example, is shown residing in a memory subsystem 48. The Auction Module 20, however, could also reside in flash memory 50 or a peripheral storage device 52. The computer system 22 also has one or more central processors 54 executing an operating system. The operating system, as is well known, has a set of instructions that control the internal functions of the computer system 22. A system bus 56 communicates signals, such as data signals, control signals, and address signals, between the central processor 54 and a system controller 58 (typically called a "Northbridge"). The system controller 58 provides a bridging function between the one or more central processors 54, a graphics subsystem 60, the memory subsystem 48, and a PCI (Peripheral Controller Interface) bus 62. The PCI bus 62 is controlled by a Peripheral Bus Controller 64. The Peripheral Bus Controller 64 (typically called a "Southbridge") is an integrated circuit that serves as an input/output hub for various peripheral ports. These peripheral ports are shown including a keyboard port 66, a mouse port 68, a serial port 70 and/or a parallel port 72 for a video display unit, one or more external device ports 74, and networking ports 76 (such as SCSI or Ethernet). The Peripheral Bus Controller 64 also includes an audio subsystem 78. Those of ordinary skill in the art understand that the program, processes, methods, and systems described in this patent are not limited to any particular computer system or computer hardware. Other architectures are possible, and the Auction Module 20 can operate in any architecture.

Those of ordinary skill in the art also understand the central processor 48 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450, www.amd.com). The Intel Corporation also manufactures a family of X86 and P86 microprocessors (Intel Corporation, 2200 Mission College Blvd., Santa Clara, Calif. 95052-8119, 408.765.8080, www.intel.com). Other manufacturers also offer microprocessors. Such other manufacturers include Motorola, Inc. (1303 East Algonquin Road, P.O. Box A3309 Schaumburg, Ill. 60196, www.Motorola.com), International Business Machines Corp. (New Orchard Road, Armonk, N.Y. 10504, (914) 499-1900, www.ibm.com), Sun Microsystems, Inc. (4150 Network Circle, Santa Clara Calif. 95054, www.sun.com), and Transmeta Corp. (3940 Freedom Circle, Santa Clara, Calif. 95054, www.transmeta.com). Those skilled in the art further understand that the program, processes, methods, and systems described in this patent are not limited to any particular manufacturer's central processor.

The preferred operating system is DOS-based. That is, the preferred operating system may be a WINDOWS-based operating system (WINDOWS® is a registered trademark of Microsoft Corporation, One Microsoft Way, Redmond Wash. 98052-6399, 425.882.8080, www.Microsoft.com). Any other operating system, however, is suitable with this invention. Some suitable operating systems include the UNIX® operating system (UNIX® is a registered trademark of the Open Source Group, www.opensource.org) and a LINUX® or a RED HAT® LINUX-based system (LINUX® is a registered trademark of Linus Torvalds, and RED HAT® is a registered trademark of Red Hat, Inc., Research Triangle Park, North Carolina, 1-888-733-4281, www.redhat.com). Still more suitable operating systems include the Mac® OS (Mac® is a registered trademark of Apple Computer, Inc., 1 Infinite Loop, Cupertino, Calif. 95014, 408.996.1010, www.apple.com). Those of ordinary skill in the art again understand that the program, processes, methods, and systems described in this patent are not limited to any particular operating system.

The system memory device (shown as memory subsystem 48, flash memory 50, or peripheral storage device 52) may also contain an application program. The application program cooperates with the operating system and with a video display unit (via the serial port 70 and/or the parallel port 72) to provide a Graphical User Interface (GUI). The Graphical User Interface typically includes a combination of signals communicated along the keyboard port 66 and the mouse port 68. The Graphical User Interface provides a convenient visual and/or audible interface with a user of the computer system 22.

Figure 3:
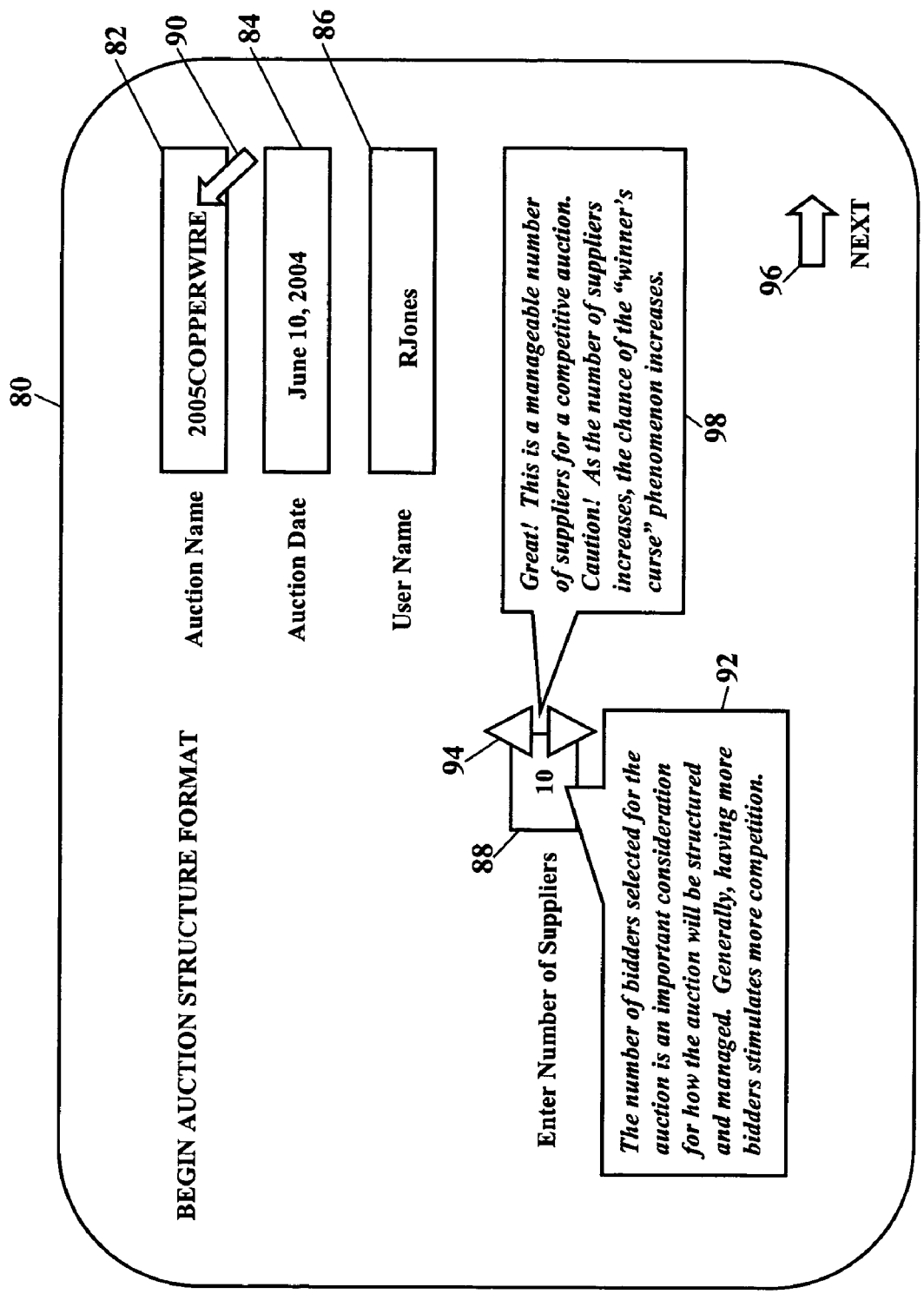

FIGS. 3-9 are schematics illustrating Graphical User Interfaces, according to the embodiments of this invention. The Auction Module (shown as reference numeral 20 in FIGS. 1 and 2) of the present invention, operating within a system memory device of the computer system (shown as reference numeral 22 in FIGS. 1 and 2), allows the user to structure an online auction. FIG. 3 shows a representation of a first Graphical User Interface 80 that the Auction Module might present to the user. The Auction Module presents the Graphical User Interface 80 on a display device and allows the user to enter data and to make choices. The Graphical User Interface 80 includes an auction name data field 82, an auction date data field 84, a user name data field 86, and a number of suppliers data field 88. The subscriber places a curser 90 in the auction name data field 82 and types a desired name for the auction structure. The subscriber then places the curser 88 in the auction date data field 84 and in the user name data field 86 and types the respective information. The user also places the curser 90 in the number of suppliers data field 88 and enters the number of suppliers that will bid in the auction.

The Graphical User Interface 80 may also include annotations. These annotations provide information that helps the user make choices/decisions to optimize the auction outcome. FIG. 3, for example, shows a supplier's annotation 92. The supplier's annotation 92 helps the user understand how the number the number of suppliers can affect the optimum results of the auction. More qualified suppliers, as a generally accepted rule of thumb, tend to spur more competitive bidding. Too many bidders, however, may also adversely affect bidding. This invention, then, suggests that the user obtain at least four (4) bidding suppliers. The Graphical User Interface 80 may even include a pair of scroll icons 94. These scroll icons 94 allow the user to scroll up and down pre-selected inputs for the number of suppliers. The user would then "highlight" or otherwise select the desired pre-selected number of suppliers. One advantage of using these scroll icons 94 is that the user's inputs can be confined to desired numerical ranges. Because this invention suggests that the user obtain at least four (4) bidding suppliers, the pre-selected number of suppliers may not be less than three (3). That is, the least number of suppliers that the user may scroll and input is "4." If, for example, the user insists on inputting "4" as the number of bidding suppliers, the supplier's annotation 92 may present a message "Attempt to obtain more suppliers unless prohibited by time/money." Should the user insist on inputting only "3" suppliers, the supplier's annotation 92 may present a message "Conduct reverse auction only if suppliers are competitive and non-collusive." When the user has completed this first Graphical User Interface 80, the user moves the curser 90 and selects a "NEXT" action button 96.

The Graphical User Interface 80 may also caution against the "winner's curse." As FIG. 3 shows, a second supplier's annotation 98 may also help explain how the number the number of suppliers can affect the optimum results of the auction. This second supplier's annotation 96 cautions the user to avoid the "winner's curse." The winner's curse occurs when a winning bid exceeds the bidder's own value. That is, in the case of a reverse auction, a winning supplier wins the auction by bidding a price either i) below their self-imposed floor or ii) below their capability to break even. The winner's curse may occur in a very competitive market. The winner's curse may also occur when the bidding suppliers are not given adequate information to properly formulate their total costs. When suppliers lack adequate information, the suppliers are forced to make often incorrect assumptions. The lowest-bidding, winning supplier then strains to deliver the goods/services without harming their bottom line.

The winner's curse affects both the supplier and the purchaser. When the winning bid exceeds the bidder's own value, the cost structure is undesirable and, possibly, unattainable. If the winning supplier is later unable to complete the sale of goods/services, the purchaser wastes time and resources searching for another source, thus eliminating the time efficiency that the reverse auction initially offered. Even if business is awarded to the lowest-bidding supplier at the close-of-auction price, the purchaser could also find the supplier attempting to increase revenues in other areas associated with the auctioned item, such as in warranties, service levels, transportation costs, or a reduction in total quality.

One method of reducing the "winner's curse" could be the use of a Vickrey auction. In a typical (reverse) Vickrey auction, the winning (lowest) bidder pays the price of the next lowest bidder. This is also known as a "second-price, sealed bid" auction and is effective when all participants fully understand the structure. The Vickrey auction can be further modified so that bidders can only view their bid rank—bidders cannot see the winning bid value. While the winner's curse in reverse auctions is elevated when there are more bidders, a Vickrey auction is more successful for both the buyers and sellers when there are more bidders, thus driving the result toward the true market price. More bidding suppliers also decreases the chance that a few oligarchic suppliers are colluding. Whether or not the suppliers are knowledgeable on the winner's curse phenomenon, using the Vickrey auction could make them less fearful of overextending, such that the more aggressive bidders will be comforted that they have a realistic opportunity to win, while ending up paying closer to their true costs.

Figure 4:
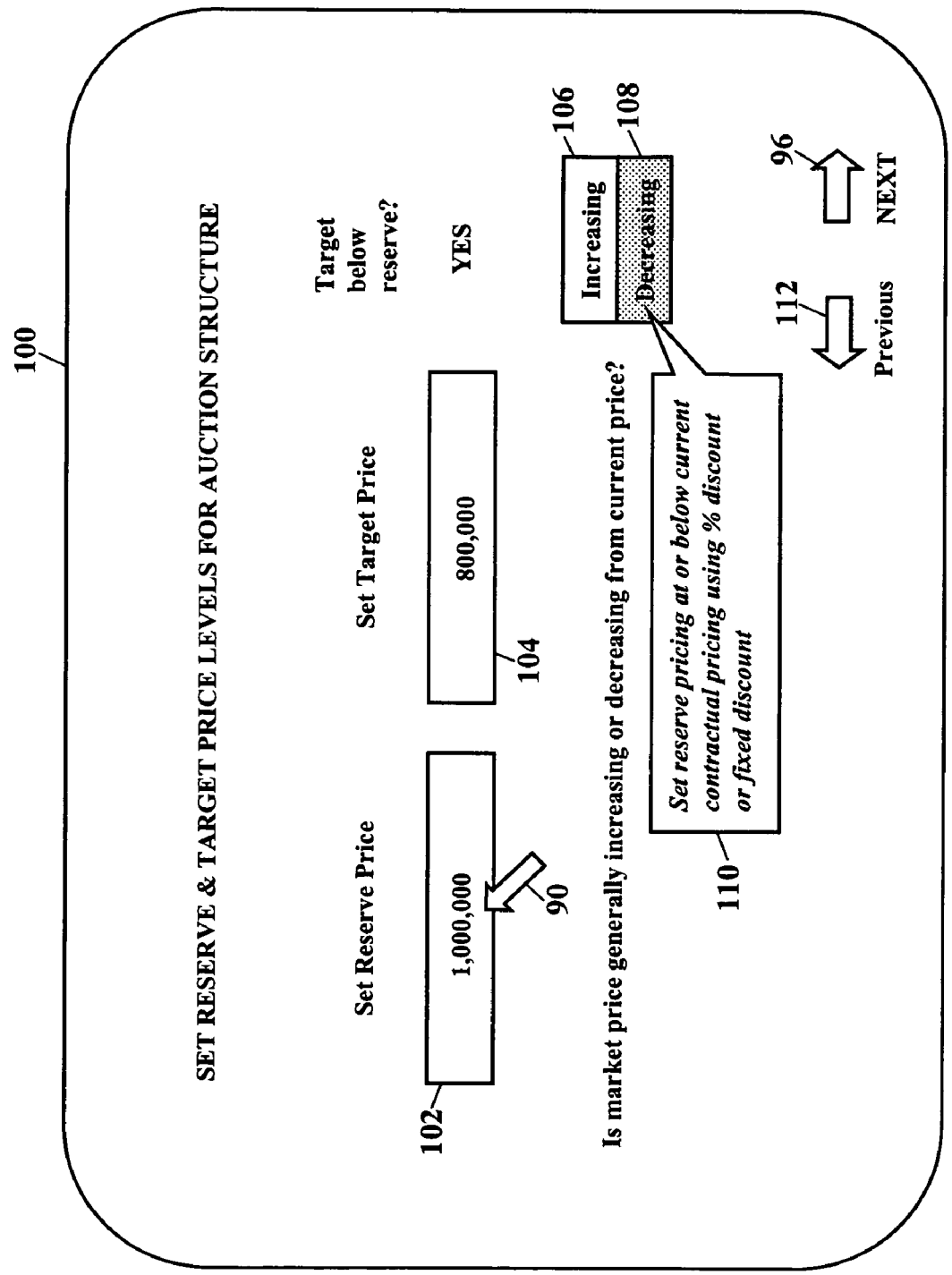

FIG. 4 shows a second Graphical User Interface 100. Here the user inputs pricing levels for the auction. The user places the curser 90 in a set reserve price data field 102 and inputs a desired reserve price for the auction. The user also places the curser 90 in a set target price data field 104 and inputs a target price for the auction. The user is then asked to select whether the market price is generally increasing or decreasing from current price. The user places the curser 90 in either an "Increasing" data field 106 or a "Decreasing" data field 108 and "highlights" or otherwise selects the desired answer. The Auction Module may also present a pricing annotation 110. This pricing annotation 110 provides information that helps the user make pricing choices/decisions to optimize the auction outcome. As FIG. 4 shows, when the user decides the market price is generally decreasing from current contractual pricing, the pricing annotation 110 suggests that the user keep the reserve price at or below current contractual pricing. The Auction Module may even suggest the user set the target price below the current contract price using either a fixed discount or a percentage discount. If, however, the market price is rising, the Auction Module may suggest the user set the reserve price close to the current contract price. If the market price is above the current contract price, the Auction Module may suggest setting the target price to the current contract price. When the user has completed this second Graphical User Interface 100, the user then selects the "NEXT" action button 96 to advance to the next inputs. If the user, however, wishes to return to the previous page, the user instead selects a "Previous" action button 112.

FIG. 5 shows a third Graphical User Interface 114. Here the user inputs pricing visibility for the auction. The Auction Module first suggests that the user consider a Vickrey auction structure. The user places the curser 90 in the desired response. If the user desires to utilize a Vickrey-type structure, the user selects "Yes, use a modified Vickrey auction." The user may alternatively select "No, a Vickrey auction is not desired." If the user declines to use a Vickrey auction, the user is then prompted to select supplier visibility during the auction. The user places the curser 90 in a visibility data field 116 and selects the desired visibility. A visibility annotation 118 provides information that helps the user make visibility decisions that optimize the auction outcome. The "Rank-only visibility"option has been shown to incite bidding and keep suppliers interested for longer periods of time. The "Rank-only visibility" option also prevents market price disclosure to non-competitive bidders (as in when market prices are rising). The "All bid prices visible" option distributes dynamic market price ranges to all active bidders. The "All bid prices visible" option is perhaps helpful when market prices are declining and, thus, coaxing suppliers to match the competition. Notice, however, that if the user desires a Vickrey structure, the Auction Module requires that the user utilize a modified Vickrey format. The modified Vickrey auction only allows bidders to view the ranking of the bidder's bid. The bidder is not informed of the monetary value of the winning bid. The selection of a Vickrey auction structure overrides the user's visibility options. When the user has completed this third Graphical User Interface 114, the user then selects the "NEXT" action button 96 to advance to the next inputs. If the user, however, wishes to return to a previous page, the user instead selects the "Previous"action button 112.

Figure 6:
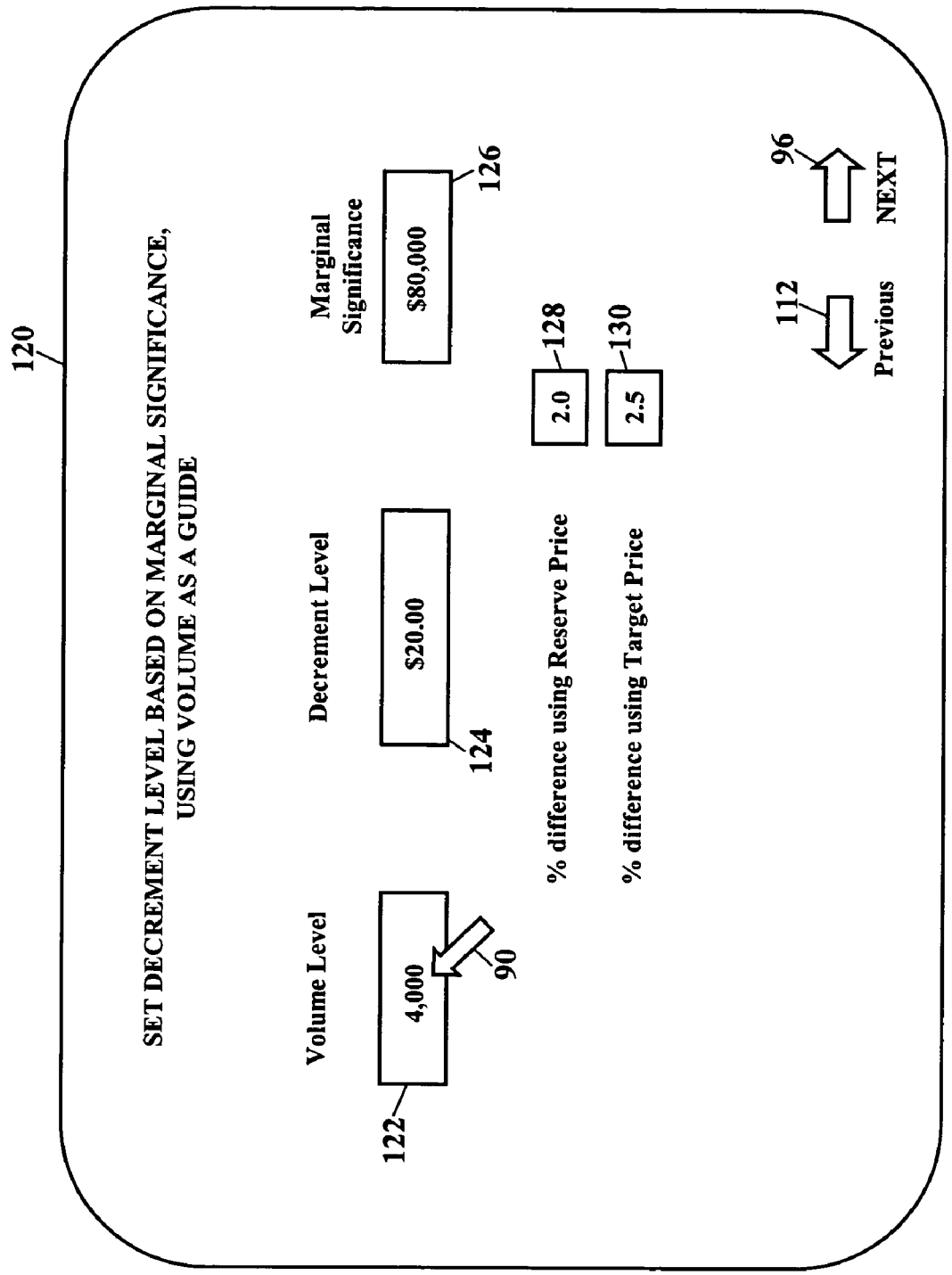

FIG. 6 shows a fourth Graphical User Interface 120. Here the user inputs pricing decrements for the auction. The user places the curser 90 and inputs a volume level 122 at which the bidding suppliers are estimating their cost/pricing. If the volume level 122 is expressed as a maximum and minimum range, the user might consider inputting an average volume. The user then places the curser 90 and inputs a decrement level 124 and a marginal significance 126. The decrement level 124 may be expressed as any dollar amount. The decrement level 124 should also be the smallest value of significance for overall savings. The marginal significance 126 is the purchase amount not saved because the next best supplier did not want to drop an additional decrement level. If, for example, a bid is $5 less for a volume of 3000 units, the potential savings are $15,000. If, however, the bid decrement was $10, yet the second place bidder would only bid $5 lower, then $15,000 is the opportunity cost to the buyer. In this example, then, the marginal significance 126 is $15,000. The user then places the curser 90 and inputs a percentage decrement 128 for the reserve price and a percentage decrement 130 for the target price. When the user has completed this fourth Graphical User Interface 120, the user then selects the "NEXT" action button 96 to advance to the next inputs. If the user, however, wishes to return to a previous page, the user instead selects the "Previous" action button 112.

FIG. 7 shows a fifth Graphical User Interface 132. Here the user inputs weighting factors to influence the selection of a winning bidder. Sometimes a particular supplier may have unquantifiable skills, abilities, and/or practices that should influence the selection of their bid. Sometimes diversity considerations might influence procurement selections. Other factors, such as switching costs, credit terms, transportation, warranty, and risk, might also be factors that can influence total cost and, thus, selection of winning bids. Whatever these factors might be, the Auction Module has the ability to consider these factors. FIG. 7 allows the user to input a supplier name 134 and a corresponding weighting factor 136. The weighting factor 136 may be expressed as either a dollar amount or as a percentage decrement. When each supplier's bid is received, the Auction Module applies the corresponding weighting factor 136 and automatically adjusts the supplier's bid. These weighting factors 136 are usually unknown to each supplier—the weighting factors 136 are only known to the buyer. The suppliers, preferably, will not see their discounted bids during the auction. The weighting factors 136 are preferably completely unknown to the suppliers. When the user has completed this fifth Graphical User Interface 132, the user then selects the "NEXT" action button 96 to advance to the next inputs. If the user, however, wishes to return to a previous page, the user instead selects the "Previous" action button 112.

Figure 8:
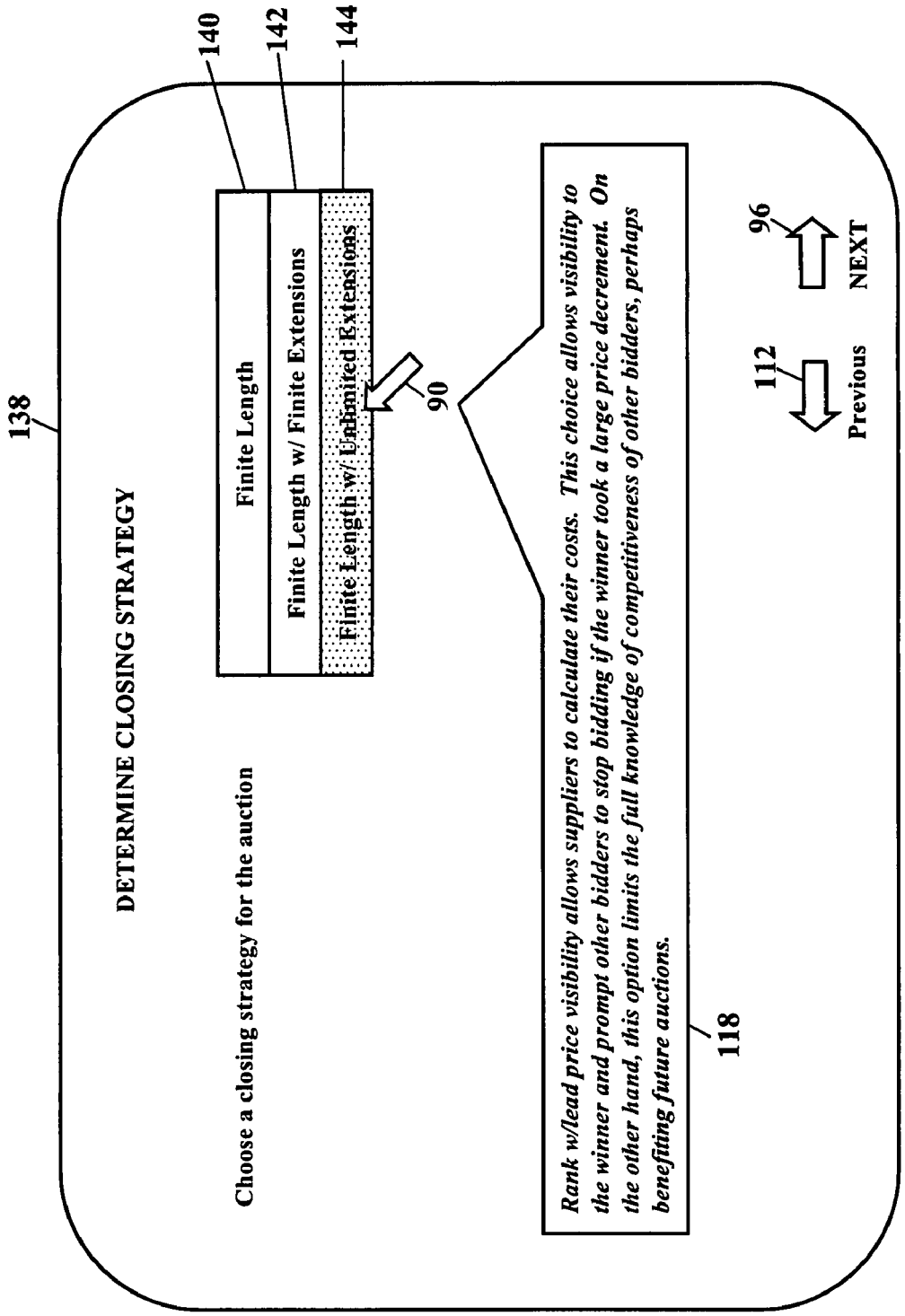

FIG. 8 shows a sixth Graphical User Interface 138. Here the user selects a closing strategy for the auction. The user places the curser 90 and selects amongst various closing strategies. A finite length 140 auction has a defined start time and stop time, and no bidder can request/obtain an extension of time. If a finite number of extensions are permitted (shown as reference numeral 142), then one or more suppliers can request an extension of time for submitting bids. If an unlimited number of extensions are permitted (shown as reference numeral 144), suppliers can request as many extensions as necessary in an effort to drive down bidding. The option for unlimited extensions 144 allows suppliers to exhaust their bidding attempts, and is usually thought best for shorter auction events. When the user has completed this sixth Graphical User Interface 138, the user then selects the "NEXT" action button 96 to advance to a summary page. If the user, however, wishes to return to a previous page, the user instead selects the "Previous" action button 112.

FIG. 9 shows a summary page 146. This summary page 146 is another Graphical User Interface that presents the inputs and information the user has specified. The summary page 146 also allows the user opportunities to revise/alter the inputs and information. The summary page 146 also includes various "Edit" action buttons 148 that return to each respective Graphical User Interface. If the user wishes to revise any inputs/selections/information, the user need only place the curser 90 and select the appropriate "Edit" action button 148. When the user is satisfied with the inputs/selections/information, the user can place the curser 90 and select a "SAVE" action button 150 and/or a "PRINT" action button 152.

Figure 10:
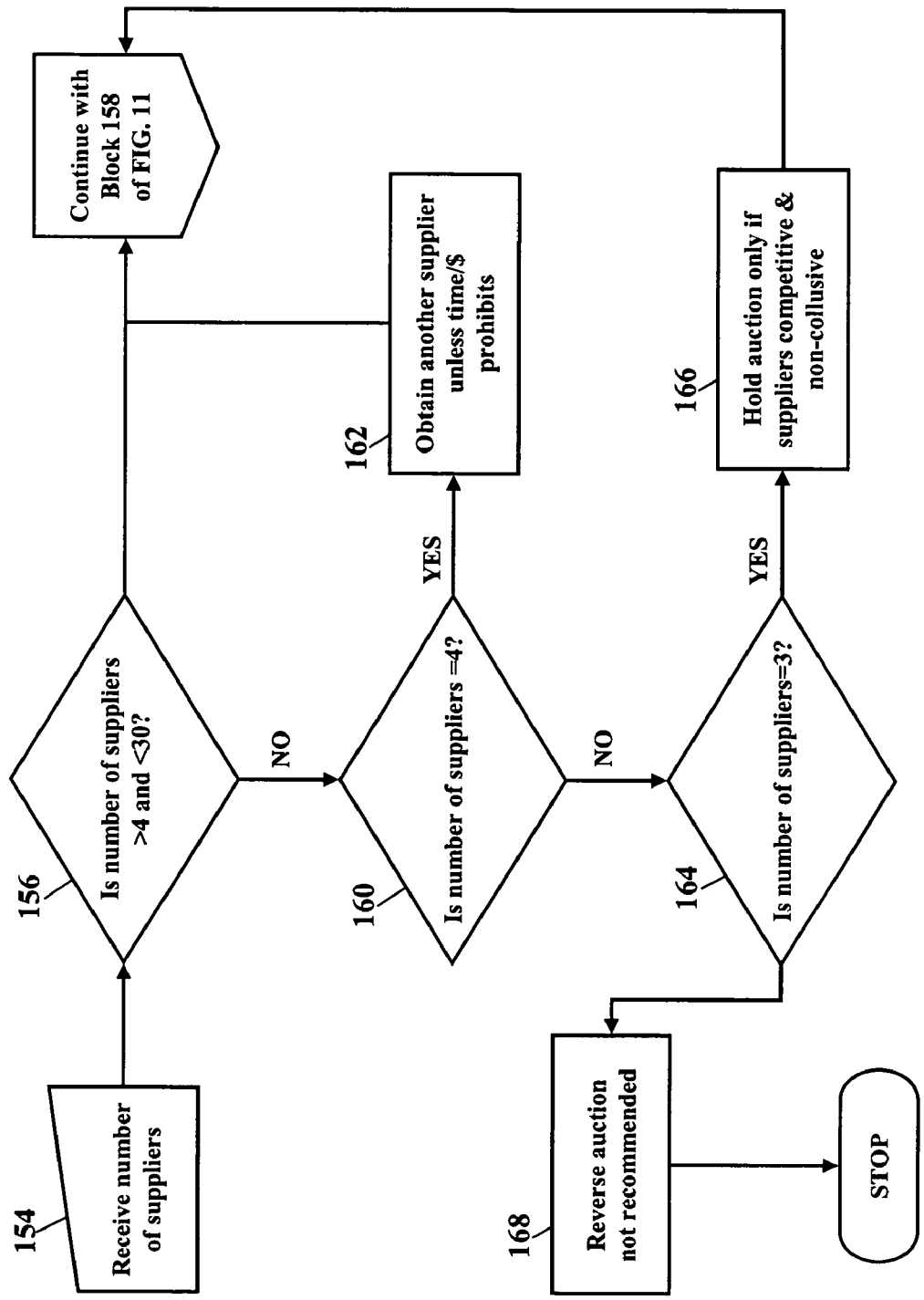
FIGS. 10-14 are flowcharts illustrating a method of selecting a structure for an online auction, according to the embodiments of this invention.

FIG. 10 is a flowchart illustrating a method for selecting a structure for an auction. A user inputs the number of suppliers for the auctioned goods/services (Block 154). The method then determines whether the number of participating suppliers is adequate for an online, reverse auction. If the number of suppliers is greater than four (4) and less than thirty (30) (Block 156), then the method proceeds to receive market pricing information (see Block 158 of FIG. 11). If the number of suppliers is equal to four (4) (Block 160), then the user is prompted to obtain more suppliers, unless time and money constraints prohibit further sourcing (Block 162). If the number if suppliers is equal to three (3) (Block 164), then the user is prompted to only auction the goods/services if the suppliers have a competitive relationship and do not collude to maintain pricing (Block 166). If the number if suppliers is not equal to three (3) (Block 164), then a reverse auction is not recommended (Block 168).

Figure 11:
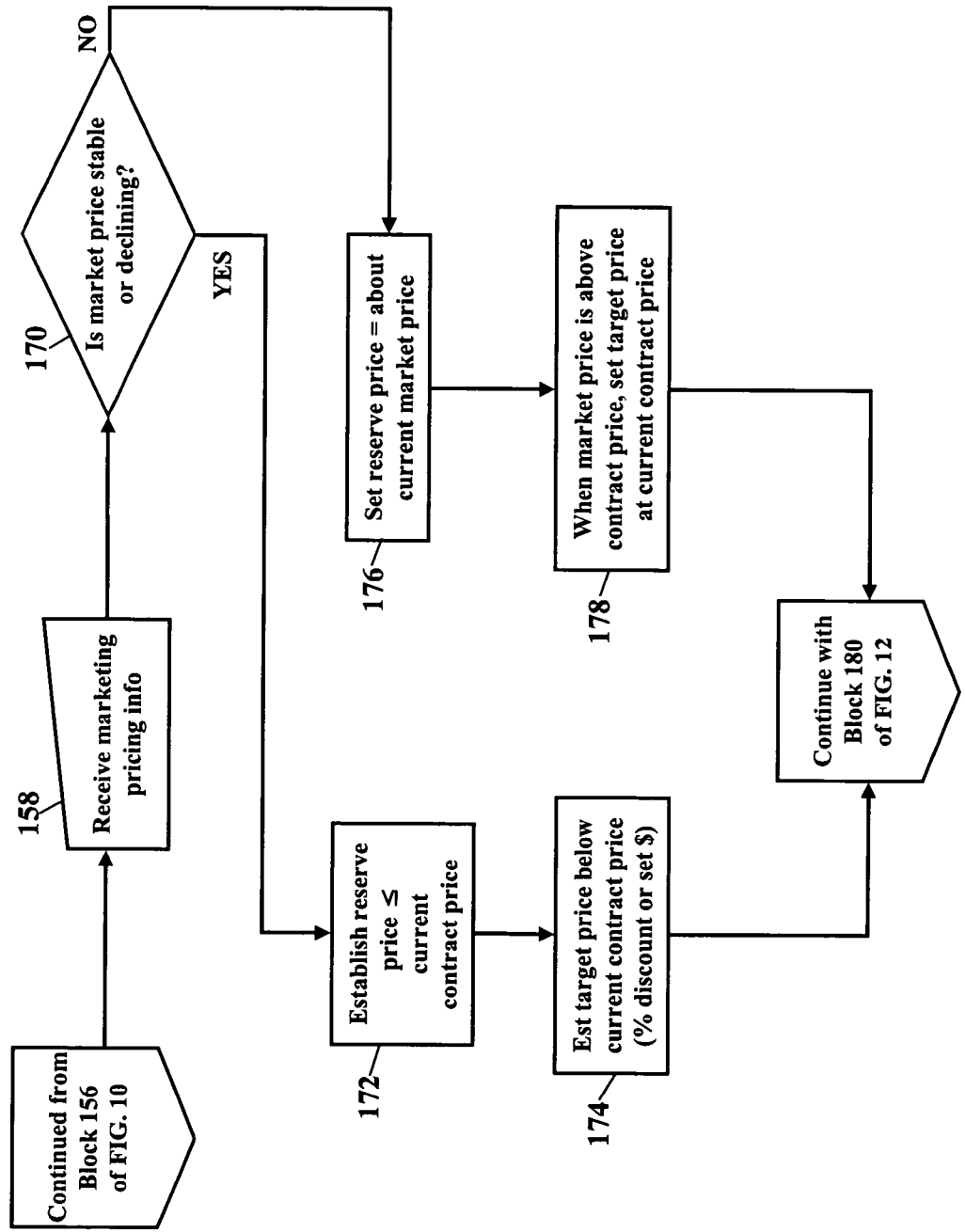

The flowchart continues with FIG. 11. If the number of suppliers is greater than four (4) and less than thirty (30) (as Block 156 of FIG. 10 shows), then market pricing information is received (Block 158). If the market price is stable or declining (Block 170), then the user is prompted to enter a reserve price at or below current contract pricing (Block 172). The user is also prompted to input a target price below current contract pricing at either a percentage discount or at a reduced set dollar amount (Block 174). If, however, the market pricing is increasing (Block 170), the user is prompted to input a reserve that is close to current contract pricing (Block 176). The user is also prompted to input a target price that is about the current contract price (Block 178).

Figure 12:
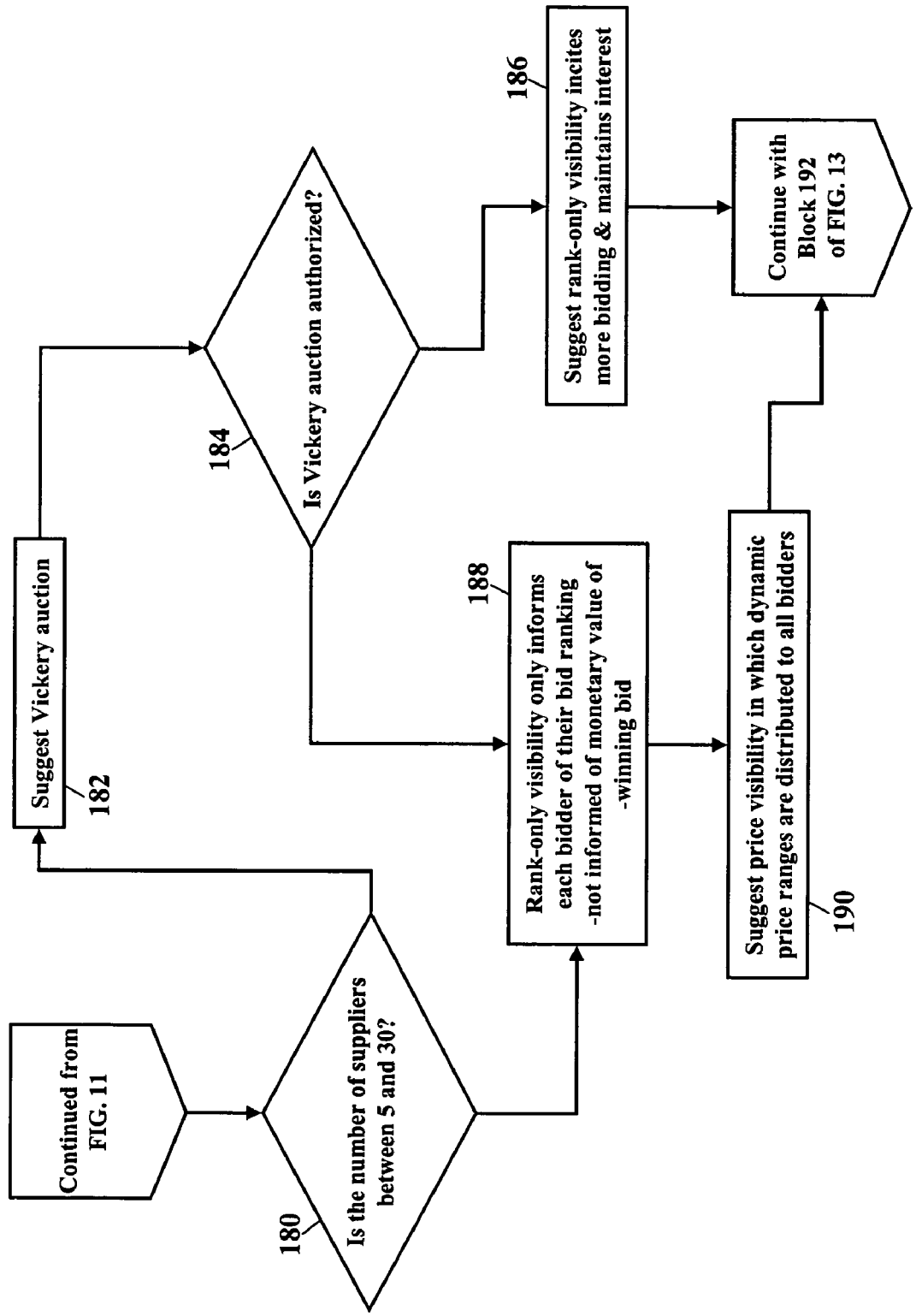

The flowchart continues with FIG. 12. Once the reserve and target pricing is received, the method then determines whether a Vickrey auction is desirable. If the number of suppliers between five (5) and thirty (30) (Block 180), then a Vickrey auction is suggested (Block 182). If the user authorizes the Vickrey auction (Block 184), then the method assumes rank-only visibility achieves the optimum outcome (Block 186). If, however, the user declines to authorize a Vickrey auction (Block 184), then the method suggests a rank-only visibility for the auction (Block 188). When rank-only visibility is chosen, each bidder to the auction is only informed of the ranking of the bidder's bid—the bidder is not informed of a monetary value of a winning bid. A price visibility could also be suggested (Block 190), in which dynamic price ranges are distributed to all bidders. The dynamic price ranges may coax suppliers into competitive bidding.

Figure 13:
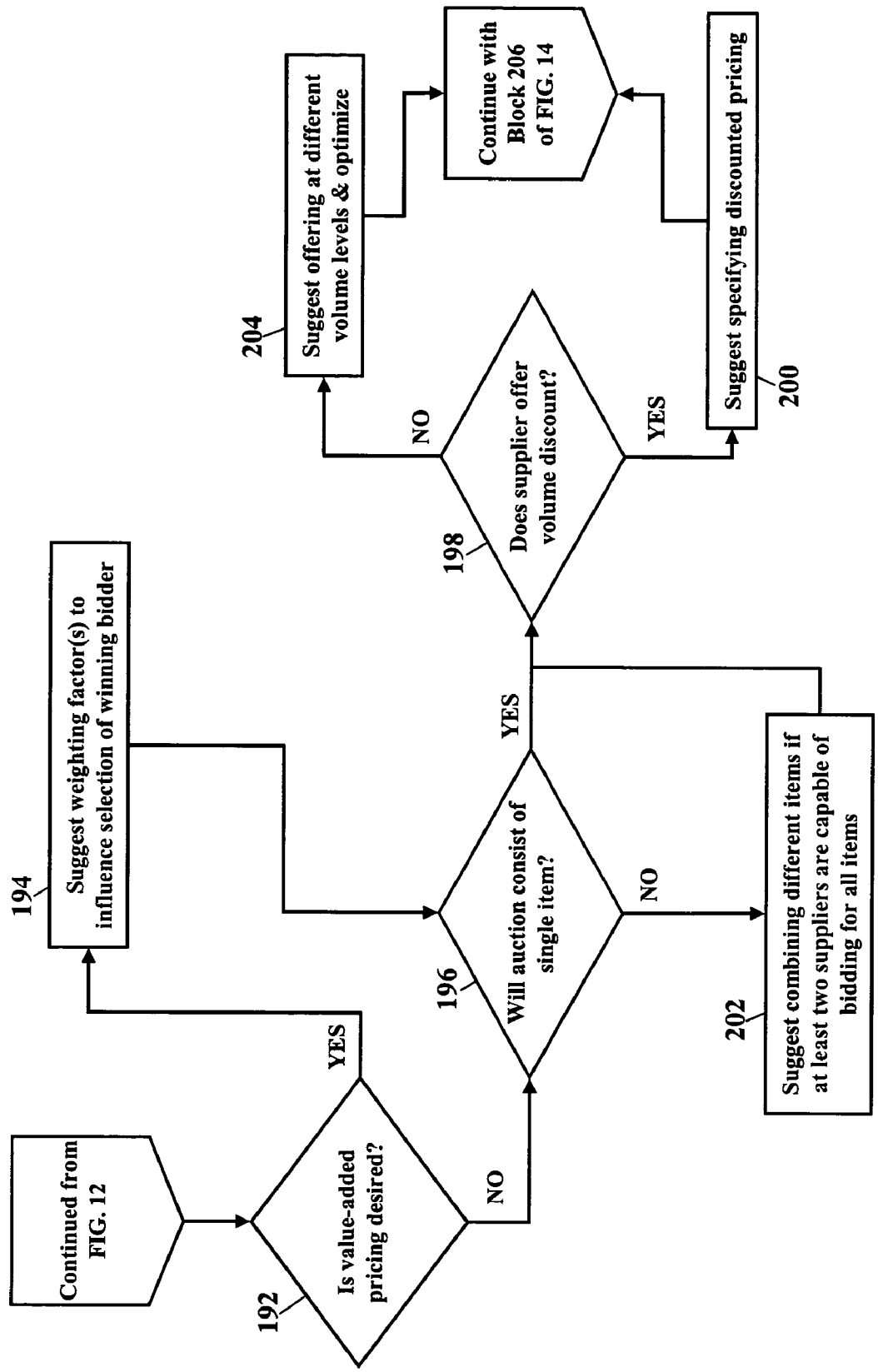

The flowchart continues with FIG. 13. Sometimes a particular supplier may have unquantifiable skills, abilities, and/or practices that should influence the selection of their bid. Sometimes diversity considerations might influence procurement selections. Other factors, such as switching costs, credit terms, transportation, warranty, and risk, might also be factors that can influence total cost and, thus, selection of winning bids. If value-added pricing is desired (Block 192), one or more weighting factors are suggested to influence selection of a winning bidder (Block 194). The user typically inputs a supplier's name and a corresponding weighting factor. The weighting factor may be expressed as either a dollar amount or as a percentage decrement. When each supplier's bid is received, the method adjusts the bid using each supplier's corresponding weighting factor.

Volume discounts are also considered. If the auction event consists of a single item (Block 196), and if a supplier offers a volume discount on this single item (Block 198), then the method suggests specifying discounted pricing for volume considerations (Block 200). The method may suggest specifying an expected or average volume requirement. A single price point may also be suggested, unless volume is unambiguous and a general price point is best specified. If, however, the auction event does not consist of a single item (Block 196), then the method suggests combining different items if at least two suppliers are capable of bidding for all items (Block 202). If no supplier offers a volume discount (Block 198), then the method suggests offering auctioned item at different volume levels and optimizing the results using a post-auction analysis to determine the optimum results (Block 204).

Figure 14:
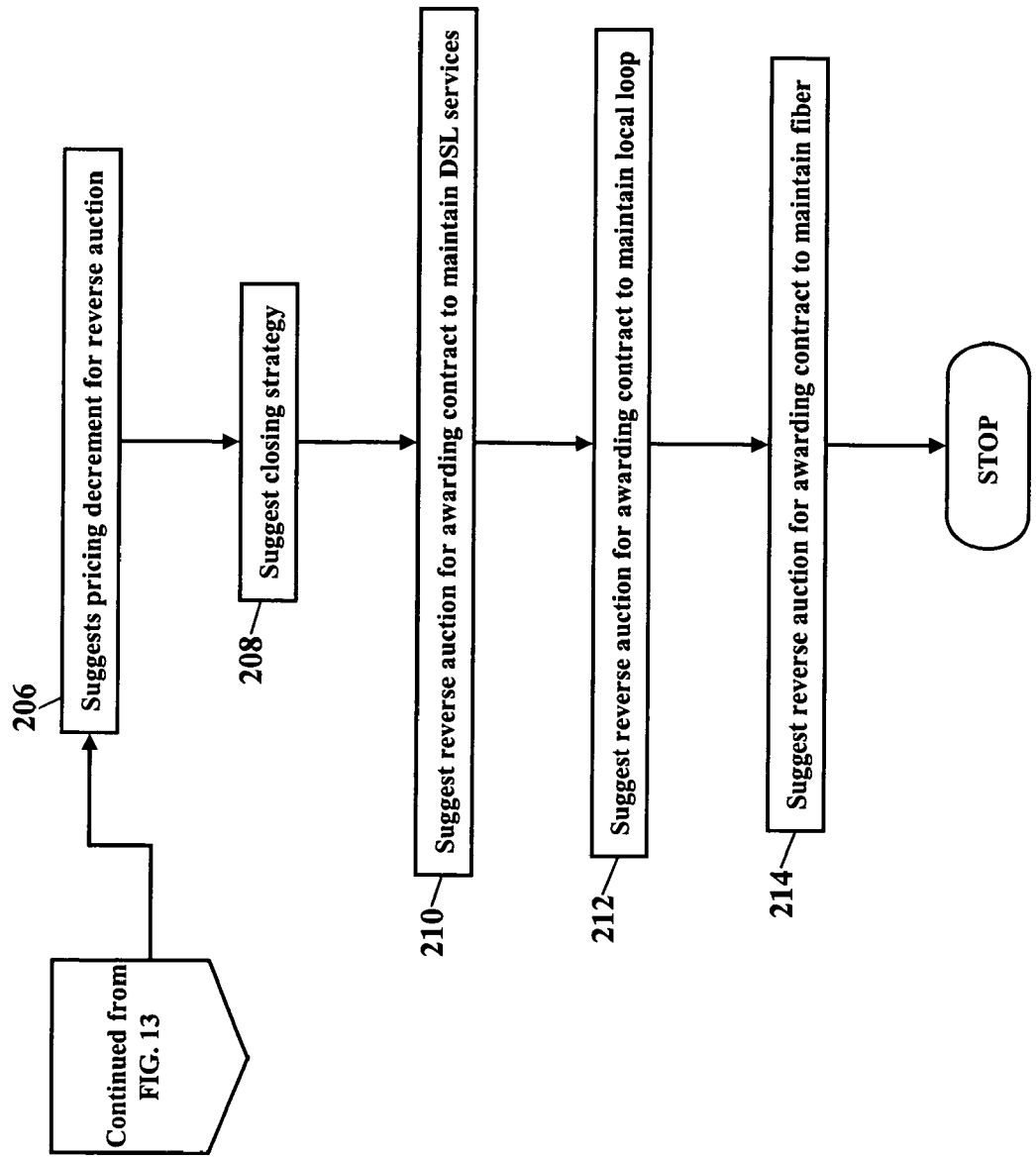

The flowchart continues with FIG. 14. Here the method suggests a pricing decrement for the reverse auction (Block 206). The method receives a volume level at which the bidding suppliers are estimating their cost/pricing. The method also receives a decrement level and a marginal significance. The decrement level is the smallest value of significance for overall savings. The marginal significance is the purchase amount not saved because the next best supplier did not want to drop an additional decrement level. The user also inputs a percentage decrement for the reserve price and a percentage decrement for the target price. These pricing decrements are used to structure the auction for optimum results. The user is then prompted to select a closing strategy for the online auction. The method may suggest a preferred closing strategy based upon the user's previous inputs (Block 208). The method may suggest a reverse auction for awarding a contract to maintain Digital Subscriber Line ("DSL") services (Block 210). The method may also suggest a reverse auction for awarding a contract to maintain a local loop in a telecommunications network (Block 212) and/or for awarding a contract to maintain fiber optic cable in a telecommunications network (Block 214).

The Auction Module may be physically embodied on or in a computer-readable medium. This computer-readable medium may include CD-ROM, DVD, tape, cassette, floppy disk, memory card, and large-capacity disk (such as IOMEGA®, ZIP®, JAZZ®, and other large-capacity memory products (IOMEGA®, ZIP®), and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the present invention, allow the Auction Module to be easily disseminated. A computer program product for selecting a structure for an auction includes the Auction Module stored on the computer-readable medium. The Auction Module prompts a user to input details of the auction and suggests a reverse auction for sourcing goods and services in a telecommunications environment.

The Auction Module may also be physically embodied on or in any addressable (e.g., HTTP, I.E.E.E. 802.11, Wireless Application Protocol (WAP)) wireline or wireless device capable of presenting an IP address. Examples could include a computer, a wireless personal digital assistant (PDA), an Internet Protocol mobile phone, or a wireless pager.

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of recommending a structure for an auction, comprising:
    causing display of an interactive graphical user interface having data fields for specifying the structure of the auction;
    prompting a user to input details of the auction into the data fields;
    presenting an annotation in the graphical user interface that a minimum number of bidding suppliers should be four or more;
    receiving, in the data fields, the input details describing an auction name, an auction date, a market price, a current price, and a number of bidding suppliers that will submit bids in the auction;
    causing display of annotations in the graphical user interface that educate the user of an impact of the input details on the auction;
    if the number of bidding suppliers is less than three, then presenting a message in the graphical user interface advising that a reverse auction structure is not recommended;
    if the number of bidding suppliers is three, then presenting a message in the graphical user interface advising that the bidding suppliers should be competitive and non-collusive;
    if the number of bidding suppliers is four, then presenting another message in the graphical user interface that more bidding suppliers should be obtained;
    if the number of bidding suppliers is greater than four but less than thirty, causing display of a market price prompt within the graphical user interface, the market price prompt requesting whether the market price is increasing or decreasing from the current price;
    receiving a selection within the graphical user interface of whether the market price is stable, increasing or declining from the current price;
    if the market price is stable or declining, then
        a computer establishing a reserve price that is less than or equal to the contract price, and
        establishing a target price below the current contract price;
    if, however, the market price is increasing, then
        the computer setting the reserve price approximately equal to the contract price, and
        when the market price is above the contract price, then setting the target price equal to the current contract price;
    if the number of bidding suppliers is between five and thirty, then causing display in the graphical user interface of a recommendation for a reverse Vickrey auction structure for sourcing goods and services based on the input details, such that suppliers compete against each other to supply the goods and services to the user; and
    if, however, the user declines the reverse Vickrey auction, then causing display in the graphical user interface of a suggestion for a rank-only visibility structure for the auction, such that each bidder to the auction is only informed of a ranking of the bidder's bid, and each bidder is not informed of a monetary value of a winning bid.

2. A method according to claim 1, wherein if the number of bidding suppliers is not between five and thirty, then also causing display in the graphical user interface of the suggestion for the rank-only visibility structure for the auction.

3. A method according to claim 2, further comprising causing display in the graphical user interface of a price visibility in which dynamic price ranges are distributed to all bidders.

4. A method according to claim 3, further comprising causing display in the graphical user interface of another prompt for value-added pricing.

5. A method according to claim 4, when the user authorizes value-added pricing, then further comprising causing display in the graphical user interface of suggested weighting factors that influence selection of a winning bidder.

6. A method according to claim 5 further comprising determining whether only a single item is being auctioned.

7. A method according to claim 6, wherein if multiple items are being auctioned, then further comprising causing display of a suggestion in the graphical user interface to combine different items if at least two suppliers are capable of bidding on all items.

8. A method according to claim 6, wherein if only the single item is being auctioned, then further comprising causing display in the graphical user interface of a volume discount option offered by the supplier.

9. A method according to claim 1, further comprising causing display in the graphical user interface of a suggestion for a pricing decrement for the reverse Vickrey auction.

10. A method according to claim 1, further comprising causing display in the graphical user interface of a suggestion of the reverse Vickrey auction for awarding a contract to maintain Digital Subscriber Line services.

11. A method according to claim 1, further comprising causing display in the graphical user interface of a suggestion of the reverse Vickrey auction for awarding a contract to maintain a local loop in a telecommunications network.

12. A method according to claim 1, further comprising causing display in the graphical user interface of a suggestion of the reverse Vickrey auction for awarding a contract to maintain fiber optic cable in a telecommunications network.

13. A system, comprising:
a processor communicating with memory;
the processor causing display of an interactive graphical user interface having data fields for specifying the structure of the auction;
the processor prompting a user to input details of the auction into the data fields;
the processor presenting an annotation in the graphical user interface that a minimum number of bidding suppliers should be four or more;
the processor receiving, in the data fields, the input details describing an auction name, an auction date, a market price, a current price, and a number of bidding suppliers that will submit bids in the auction;
the processor causing display of annotations in the graphical user interface that educate the user of an impact of the input details on the auction;
if the number of bidding suppliers is less than three, then the processor presents a message in the graphical user interface advising that a reverse auction structure is not recommended;
if the number of bidding suppliers is three, then the processor presents a message in the graphical user interface advising that the bidding suppliers should be competitive and non-collusive;
if the number of bidding suppliers is four, then the processor presents another message in the graphical user interface that more bidding suppliers should be obtained;
if the number of bidding suppliers is greater than four but less than thirty, the processor causes display of a market price prompt within the graphical user interface, the market price prompt requesting whether the market price is increasing or decreasing from the current price;
the processor receiving a selection within the graphical user interface of whether the market price is stable, increasing or declining from the current price;
if the market price is stable or declining, then
  the processor establishing a reserve price that is less than or equal to the contract price, and
  the processor establishing a target price below the current contract price;
if, however, the market price is increasing, then
  the processor setting the reserve price approximately equal to the contract price, and
  when the market price is above the contract price, then the processor setting the target price equal to the current contract price;
if the number of bidding suppliers is between five and thirty, then the processor causing display in the graphical user interface of a recommendation for a reverse Vickrey auction structure for sourcing goods and services based on the input details, such that suppliers compete against each other to supply the goods and services to the user; and
if, however, the user declines the reverse Vickrey auction, then the processor causing display in the graphical user interface of a suggestion for a rank-only visibility structure for the auction, such that each bidder to the auction is only informed of a ranking of the bidder's bid, and each bidder is not informed of a monetary value of a winning bid.

14. A computer program product comprising a computer readable medium storing processor-executable instructions for performing a method of recommending a structure for an auction, the method comprising:
causing display of an interactive graphical user interface having data fields for specifying the structure of the auction;
prompting a user to input details of the auction into the data fields;
presenting an annotation in the graphical user interface that a minimum number of bidding suppliers should be four or more;
receiving, in the data fields, the input details describing an auction name, an auction date, a market price, a current price, and a number of bidding suppliers that will submit bids in the auction;
causing display of annotations in the graphical user interface that educate the user of an impact of the input details on the auction;
if the number of bidding suppliers is less than three, then presenting a message in the graphical user interface advising that a reverse auction structure is not recommended;
if the number of bidding suppliers is three, then presenting a message in the graphical user interface advising that the bidding suppliers should be competitive and non-collusive;
if the number of bidding suppliers is four, then presenting another message in the graphical user interface that more bidding suppliers should be obtained;
if the number of bidding suppliers is greater than four but less than thirty, causing display of a market price prompt within the graphical user interface, the market price prompt requesting whether the market price is increasing or decreasing from the current price;
receiving a selection within the graphical user interface of whether the market price is stable, increasing or declining from the current price;
if the market price is stable or declining, then
  establishing a target price below the current contract price; and
  establishing a target price below the current contact price;
if, however, the market price is increasing, then
  setting the reserve price approximately equal to the contract price, and
  when the market price is above the contract price, then setting the target price equal to the current contract price;
if the number of bidding suppliers is between five and thirty, then causing display in the graphical user interface of a recommendation for a reverse Vickrey auction structure for sourcing goods and services based on the input details, such that suppliers compete against each other to supply the goods and services to the user; and
if, however, the user declines the reverse Vickrey auction, then causing display in the graphical user interface of a suggestion for a rank-only visibility structure for the auction, such that each bidder to the auction is only informed of a ranking of the bidder's bid, and each bidder is not informed of a monetary value of a winning bid.

* * * * *